(12) United States Patent
Saito et al.

(10) Patent No.: US 6,791,797 B2
(45) Date of Patent: Sep. 14, 2004

(54) CYLINDRICAL MAGNETIC RECORDING MEDIUM AND METHOD FOR MANUFACTURING THE SAME

(75) Inventors: Tsatsuya Saito, Kanagawa (JP); Tohru Den, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/382,138

(22) Filed: Mar. 5, 2003

(65) Prior Publication Data

US 2003/0170416 A1 Sep. 11, 2003

(30) Foreign Application Priority Data

Mar. 8, 2002 (JP) ........................................ 2002-063737

(51) Int. Cl.7 .................................................. G11B 5/76
(52) U.S. Cl. ...................................................... 360/136
(58) Field of Search ................................. 360/133, 131, 360/135, 136; 204/42; 428/694 MP, 694 BA, 694 SG

(56) References Cited

U.S. PATENT DOCUMENTS

| | | | | |
|---|---|---|---|---|
| 4,091,158 A | * | 5/1978 | Kasuga et al. | ............... 428/216 |
| 4,109,287 A | * | 8/1978 | Kawai et al. | ................ 360/131 |
| 5,623,386 A | * | 4/1997 | Sullivan | ...................... 360/135 |
| 5,850,329 A | * | 12/1998 | Sullivan | ...................... 360/135 |
| 5,923,511 A | * | 7/1999 | Bandara et al. | ............. 360/135 |
| 2002/0031008 A1 | | 3/2002 | Den et al. | .................... 365/173 |
| 2002/0186185 A1 | | 7/2002 | Yasui et al. | ............ 428/694 TS |

FOREIGN PATENT DOCUMENTS

| | | | | |
|---|---|---|---|---|
| JP | 58-188334 | * | 11/1983 | ............. B11B/5/78 |
| JP | 62-114121 | * | 5/1987 | ........... G11B/5/704 |
| JP | 11-224422 | | 8/1999 | |

OTHER PUBLICATIONS

Furneaux et al., "The formation of controlled porosity membranes from anodically oxidized aluminum", Nature, vol. 337, p. 147 (1989).

Masuda et al., "Fabrication of Gold Nanodot Array ...Mask", Jap. J. Appl. Phys., vol. 35, part 2, No. 1B, L126–L129 (1996).

* cited by examiner

Primary Examiner—Robert S. Tupper
(74) Attorney, Agent, or Firm—Fitzpatrick, Cella, Harper & Scinto

(57) ABSTRACT

A magnetic recording medium includes a cylindrical substrate and pores embedded with a magnetic substance that are provided on the outer circumferential surface of the cylindrical substrate and aligned in tracks that are in parallel with one another along the center axis of the cylindrical substrate. The tracks have as their center the center axis of the cylindrical substrate, and form circular orbits defined by planes perpendicular to the center axis. Alternatively, the tracks are in a spiral orbit or in spiral orbits whose center is the center axis of the cylindrical substrate. The pores at intersections of vertical and horizontal rows are aligned in quadrilaterals such as squares, rectangles or rhombi.

10 Claims, 9 Drawing Sheets

- 11 Substrate
- 14 Track width
- 15 Nanohole

- Interval of nanohole (2R) 16
- 17 Diameter of nanohole (2r)
- 15 Nanohole
- 18 Magnetic substance
- 13 Alumina
- Underlying electrode layer 12
- 11 Substrate

Fig. 2 (a)
Fig. 2 (b)
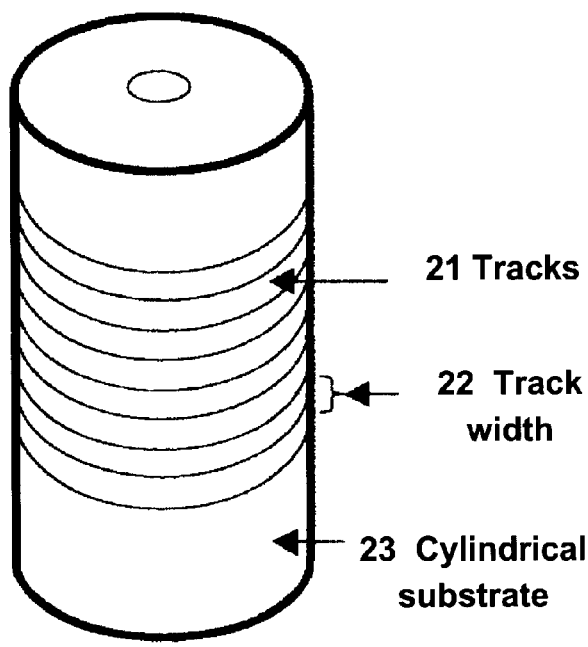
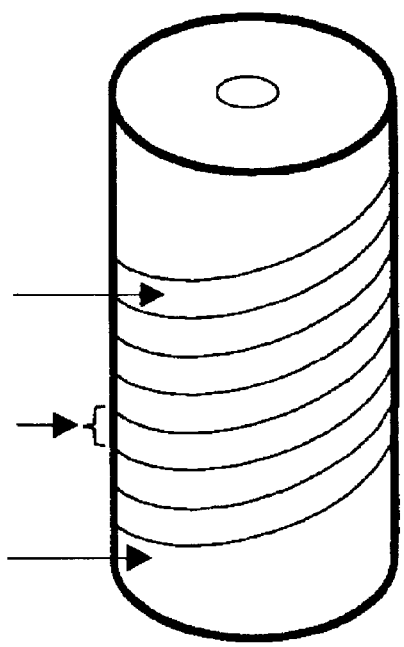
21 Tracks
22 Track width
23 Cylindrical substrate Track width 31

32 Nanohole

34 Unit structure (rectangle)

32 Nanohole

Track width 31

32 Nanohole

Track width 31

35 Unit structure (rhombi)

32 Nanohole

Track width 31

Tracks 42

Disk-shaped substrate 41

43 Pores

81 Magnetic head
84 Nanohole
83 Nanohole that is scanned by the magnetic head
82 Track that is scanned by the magnetic head

CYLINDRICAL MAGNETIC RECORDING MEDIUM AND METHOD FOR MANUFACTURING THE SAME

BACKGROUND OF THE INVENTION

1. Field of the Invention

The present invention relates to a cylindrical magnetic recording medium called a patterned medium with a constant track length, a constant recording bit number in each track and high recording density, and to a method for manufacturing the cylindrical magnetic recording medium.

2. Related Background Art

As indicated by high density/large capacity trend in hard disks in recent years, the recording density of magnetic recording media continues to increase at an astonishing annual rate of 60%–100%, and a case has even been reported in which a recording density of over 50 GB/in.$^2$ was achieved. However, further progress is anticipated, and while numerous vigorous research and development efforts continue in this area, an interest in the next generation magnetic recording medium is rising.

At present, the longitudinal recording method in which magnetization is recorded in the direction that follows along a recording surface is used as a magnetic recording method on hard disks. In the longitudinal recording method, leakage field from magnetization transfer regions provided between adjacent magnetized recording parts is used to write and read with a magnetic head. However, in the longitudinal recording method, when bit length is shortened to improve recording density, the leakage field from the magnetization transfer regions becomes smaller, which causes the leakage field to be undetected when the bit length is minuscule. Although this problem can be avoided by making the film thickness of a magnetic layer thinner, this in turn causes bit volume to be extremely small; this situation leads to a superparamagnetic state, in which magnetization direction changes with thermal energy, which makes recorded magnetization impossible to be retained. For these reasons, a recording density of approximately 100 GB/in.$^2$ is considered at present to be the limit using the longitudinal recording method.

On the other hand, the perpendicular recording method, in which a magnetic layer with magnetic anisotropy in the direction that intersects with a recording surface is the recording layer and magnetization is recorded in the direction that intersects with the recording surface, is characterized by diminishing demagnetizing field as the recording density increases, in contrast to the longitudinal recording method. Furthermore, due to the fact that the film thickness of a magnetic layer can be made thicker even when the recording density is increased, the magnetic layer does not fall into a superparamagnetic state caused by thermal energy. For these reasons, the perpendicular recording method is considered to have greater potential than the longitudinal recording method in the recording density region in excess of 100 GB/in.$^2$. Among modes of media that use the perpendicular magnetic recording method are not only disk-shaped magnetic recording media, but also cylindrical, as well as tubular-type media proposed by a research group at Tohoku University. In the perpendicular recording method, a layer of Co—Cr alloy is generally used as the recording layer. When the Co—Cr alloy forms a film through sputtering method on a substrate such as a Si substrate, glass substrate or carbon substrate, the Co and Cr grow in a composition-separation state. Of this, the parts with Co rich composition are columnar and have a hexagonal close-packed structure (an hcp structure), which becomes the parts that retain recording. The parts with Cr rich composition that grow to surround the columnar recording parts are nonmagnetic, and therefore function to weaken magnetic interaction between adjacent recording parts.

In addition, a magnetic recording medium has been devised that has a structure in which a magnetic material, which becomes the columnar recording parts, is embedded in a nonmagnetic material in an artificially regular manner through a micro-fabrication technique. For example, there are magnetic recording media that are produced by having pores formed regularly aligned on a substrate through a series of processing including coating a resist on a glass carbon substrate, patterning with electron beam lithography, and an etching processing; a magnetic material NiFe is then embedded in the pores through sputtering; and the surface is polished so that the magnetic material and the nonmagnetic material form a flat surface. In a magnetic recording medium called a patterned medium that is characterized by having one bit recorded in each of the pores in which the magnetic substance is embedded, due to the fact that the recording parts are the same shape, the same size and regularly aligned unlike the magnetic recording media in the longitudinal recording method or the perpendicular recording method, bit boundaries are regular and the medium has a structure better suited for high density recording. By making the size of the pores and the interval among the pores minuscule, it is possible to achieve a recording density of 1 Tb/in.$^2$, and this recording medium has been gaining attention as the next generation magnetic recording medium.

In order to use a patterned medium as a disk-shaped magnetic recording medium such as hard disks in which a substrate rotates at high-speed, pores embedded with a magnetic substance must be aligned in concentric tracks on the disk-shaped substrate. In a method of concentrically arranging on a disk-shaped substrate pores embedded with a magnetic substance, starting points of anodization are formed by pressing against an Al substrate a male mold (a stamper) with protrusions patterned for pores aligned at a constant interval to form a plurality of concentric tracks having a single center, and the Al substrate is anodized to form pores arranged concentrically.

Further, in a process to form anodized Alumina nanoholes through anodization of Al, the Al substrate is anodized in an acidic electrolytic solution with sulfuric acid, oxalic acid or phosphoric acid to form a porous-type anodized film (see R. C. Furneaux, W. R. Rigby & A. P. Davidson, NATURE vol. 337, p. 147 (1989)). The characteristic of the porous film is that it has a specific geometric structure in which the extremely fine columnar pores (Alumina nanoholes) with diameter of a few nm to a few hundred nm are arranged in parallel at an interval of the few dozen nm to a few hundred nm. The columnar pores have a high aspect ratio and superior uniformity in their cross-sectional diameter. The aspect ratio represents a ratio of the depth y of a pore to the diameter x of the pore, or y/x.

In addition, the structure of a porous film can be controlled to some extent by changing the conditions of anodization. It is known that pore interval can be controlled by anodizing voltage, pore depth by anodizing time, and pore diameter by pore-widening processing, each to some extent. The pore-widening processing is an etching processing of Alumina, which is generally a wet etching processing using phosphoric acid.

Furthermore, a method has been proposed to perform anodization in two stages in order to improve the perpendicularity, linearity and independence of pores of a porous film. In this method, a porous film formed by anodization is removed and another anodization is performed to create a porous film with pores having better perpendicularity, linearity and independence (Japanese Journal of Applied Physics, vol. 35, part 2, No. 1B, pp. L126-L129, 15 Jan. 1996). This method takes advantage of the fact that depressions in an Al substrate, which are formed when the anodized film formed through the first anodization is removed, become starting points to form pores in the second anodization.

Moreover, a method has also been proposed to form starting points to form pores by using a stamper in order to improve the controllability of the shape, interval and pattern of pores of a porous film, i.e., a method for creating a porous film with pores having better controllability of the shape, interval and pattern by using depressions, which are formed by pressing on the surface of an Al substrate a substrate with a plurality of protrusions on the surface, as starting points to form pores in anodization. There is also a method to form depressions that become starting points to form pores by irradiating FIB (focused ion beam) on the surface of a substrate, as well as a method to form depressions that become starting points to form patterned pores by uniformly coating a resist resin on the surface of a substrate, patterning with photolithography or electron beam lithography technique, and performing a dry etching processing.

In order to use a patterned medium as a disk-shaped magnetic recording medium used in existing hard disks in which a substrate rotates at high-speed, pores 43 embedded with a magnetic substance must be aligned in concentric tracks 42 on a disk-shaped substrate 41, as shown in FIG. 5. In this method, starting points of anodization are formed by pressing against an Al substrate a stamper with protrusions patterned to align at a constant interval to form a plurality of concentric tracks having a single center, and the Al substrate is anodized to form pores arranged concentrically. However, on a disk-shaped substrate, the length of a track is different on the inner side and outer side of the disk. As a result, when pores are aligned in a single track at a constant interval, the number of pores varies among tracks. In other words, as shown in FIG. 6, although pores are regularly aligned at an equal interval (2R) within a track, pores between different tracks are not regularly aligned. Instead, there is a plurality of intervals, such as a wide interval among pores (2R') and a narrow interval among pores (2R"), so that a regular alignment throughout the entire substrate cannot be realized. This can lead to a failure between the disk that rotates at high-speed and a head to write properly, or to an inability to retain information recorded on the disk.

SUMMARY OF THE INVENTION

The present invention relates to a patterned medium, in which the process to align pores on a substrate is significantly facilitated and in which the pores are regularly aligned throughout the entire substrate, in order to solve the problems described above. Furthermore, the present invention also relates to a patterned medium with high recording density in which, by using pores thus aligned, deviations in magnetic interaction between adjacent pores are reduced for all pores in order to retain magnetization of magnetic substance in all pores.

In accordance with one embodiment of the present invention, a cylindrical magnetic recording medium has pores that are regularly aligned. The present invention also relates to a cylindrical magnetic recording medium in which vertices formed by four randomly selected pores form a quadrilateral, a square, a rectangle or a rhombus.

In addition, the present invention relates to a recording and reproducing apparatus having a cylindrical magnetic recording medium.

The present invention also relates to a method for manufacturing a cylindrical substrate of a cylindrical magnetic recording medium with pores. In one aspect, the method comprises the steps of regularly forming pores in a surface of a three-dimensional substrate, and a process to embed a magnetic substance in the pores.

Moreover, the present invention relates to a method for manufacturing a cylindrical magnetic recording medium in which vertices formed by four randomly selected pores form a quadrilateral, a square, a rectangle or a rhombus.

The shape of the cylindrical magnetic recording medium may be any shape as long as it is similar to a cylinder.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 2(a) schematically shows a perspective view of a cylindrical magnetic recording medium having a cylindrical substrate whose outer circumference surface has tracks formed in circular orbits that are defined by planes perpendicular to the center axis of the cylindrical substrate.

FIG. 2(b) schematically shows a perspective view of a cylindrical magnetic recording medium having a cylindrical substrate whose outer circumference surface has tracks in a spiral orbit whose center is the center axis of the cylindrical substrate.

PREFERRED EMBODIMENTS
Composition of a Cylindrical Magnetic Recording Medium

A cylindrical magnetic recording medium according to the present invention is a patterned medium in which a magnetic substance is embedded in pores provided on the outer circumference surface of a cylindrical substrate in order to record one bit per pore, or to record one bit per a plurality of pores. To form regularly aligned pores on the outer circumference surface of the cylindrical substrate according to the present invention, photolithography technique or electron beam lithography technique may be used. Preferably, an Al anodizing method is used to form such regularly aligned pores. Hereafter, the present invention is described using an example in which Alumina nanoholes are used as the pores. In this method, an underlying layer is formed on a Si substrate by a sputtering or deposition method, and an anodized film whose main component is Al is formed on top of the underlying layer. The film thickness of the anodized layer is not specifically defined, but it may preferably be in a range that allows regularly aligned pores to be obtained. The diameter of anodized Alumina nanoholes (hereinafter called "nanoholes") that are formed in a self-organized manner through the Al anodizing method can be controlled in the range of a few nm to a few hundred nm, and the interval among nanoholes can also be controlled ranging from a value slightly larger than the value of the nanohole diameter to approximately 500 nm. Various types of acids may be used in the anodization of Al, but it is preferable to use a sulfuric acid bath to manufacture nanoholes at a minuscule interval, a phosphoric acid bath to manufacture nanoholes at a relatively large interval, and an oxalic acid bath to manufacture nanoholes at an intermediate interval. The processing time for anodization varies depending on the thickness of the anodized film; the processing is continued until the bottom section of the nanoholes formed reaches the bottom surface of the anodized film, and the end point of the anodization is determined by the current profile during anodization. The diameter of nanoholes may be enlarged through a pore-widening processing.

Figure 1:
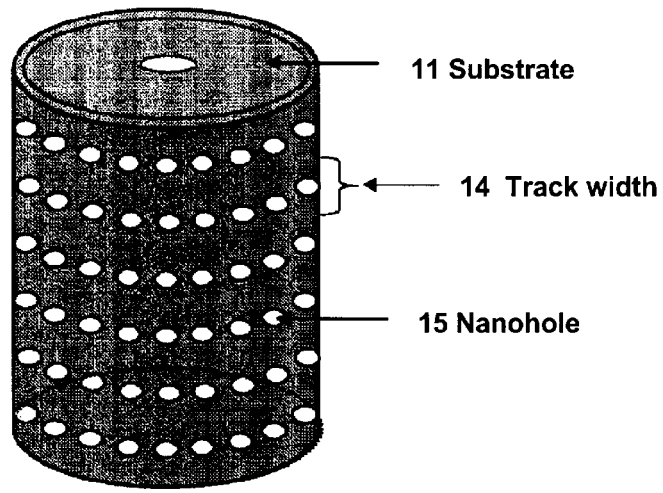
FIG. 1(a) schematically shows a perspective view of a cylindrical magnetic recording medium.
FIG. 1(b) is a cross-sectional view in part of the cylindrical magnetic recording medium, in which magnetic substance in the cylindrical magnetic recording medium is cut in a radial direction and vertical direction of the cylindrical magnetic recording medium.
Figure 1:
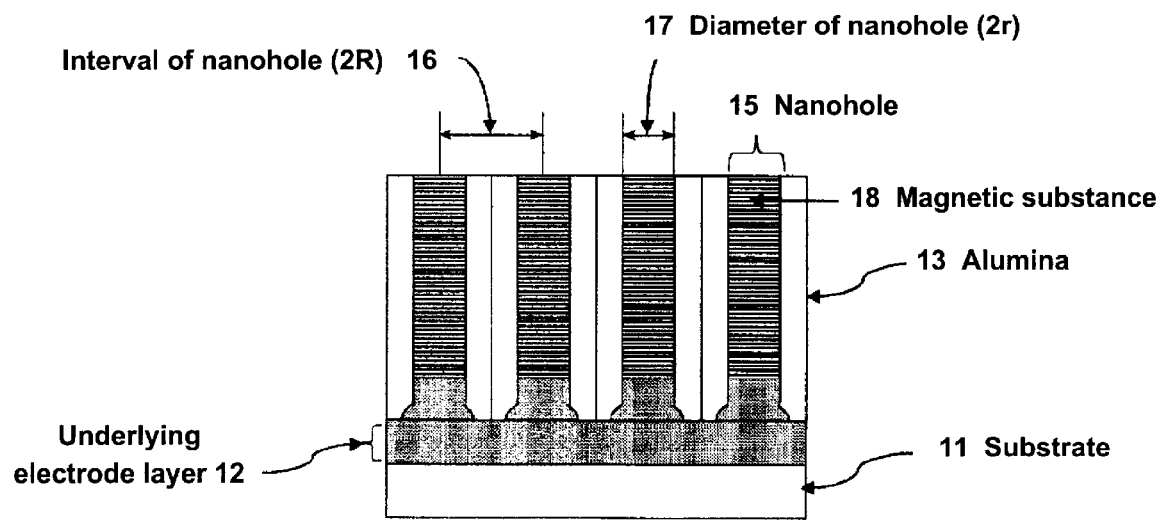

FIG. 1(a) is a perspective view of one example of a cylindrical magnetic recording medium in accordance with an embodiment of the present invention; and FIG. 1(b) is a cross-sectional view in part of the cylindrical magnetic recording medium in which magnetic substance is cut in the radial direction and vertical direction of the cylindrical magnetic recording medium. In FIGS. 1(a) and (b), reference numeral 11 denotes a substrate that may be in a cylindrical form or a circular tubular form; reference numeral 12 denotes an underlying electrode layer formed on the substrate 11; reference numeral 13 denotes Alumina; reference numeral 14 denotes a track width; reference numeral 15 denotes nanoholes; reference numeral 16 denotes an interval of nanoholes; reference numeral 17 denotes a nanohole diameter; and reference numeral 18 denotes a magnetic substance embedded in nanoholes.

The nanohole diameter 17 according to the present invention is preferably in the range of a few nm to a few hundred nm, and its aspect ratio preferably in the range of 1 to 20. The nanohole interval (2R) 16 may preferably be in the range of a few dozen nm to a few hundred nm; when $2R \cong 25$ nm, for example, the recording density of 1 TB/in.$^2$ is achieved. The shape of the nanoholes 15 is preferably cylindrical with a constant cross section and extends in a direction that intersects with a recording surface, such as a direction towards the center axis of the cylindrical shape of the substrate 11, i.e., in the radial direction. In addition, the shape of the cross section of the nanoholes 15 may be circular, elliptical or rectangular, as long as the shape of the cross section is constant for all nanoholes 15.

The nanoholes thus manufactured form tracks in circular orbits that define planes perpendicular to the center axis of the cylindrical substrate as shown in FIG. 2(a), or tracks in a spiral orbit whose center is the center axis of the cylindrical substrate, as shown in FIG. 2(b).

Figure 3:
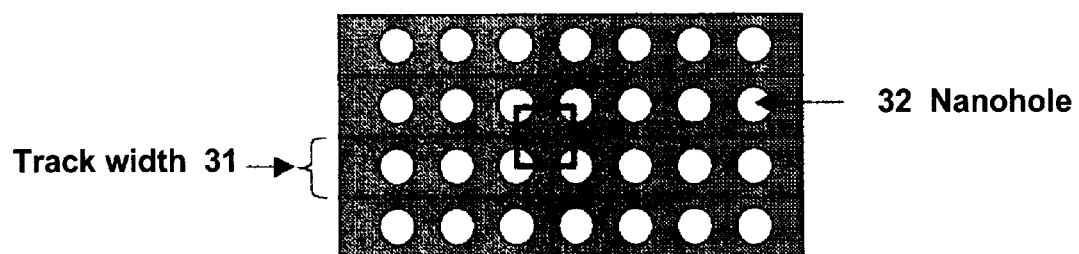
FIG. 3(a) schematically shows a pattern of nanoholes aligned in squares to form tracks in circular orbits that are defined by planes perpendicular to the center axis of a cylindrical substrate of a cylindrical magnetic recording medium.
FIG. 3(b) schematically shows a pattern of nanoholes aligned in squares to form tracks in a spiral orbit whose center is the center axis of a cylindrical substrate of a cylindrical magnetic recording medium.
Figure 3:
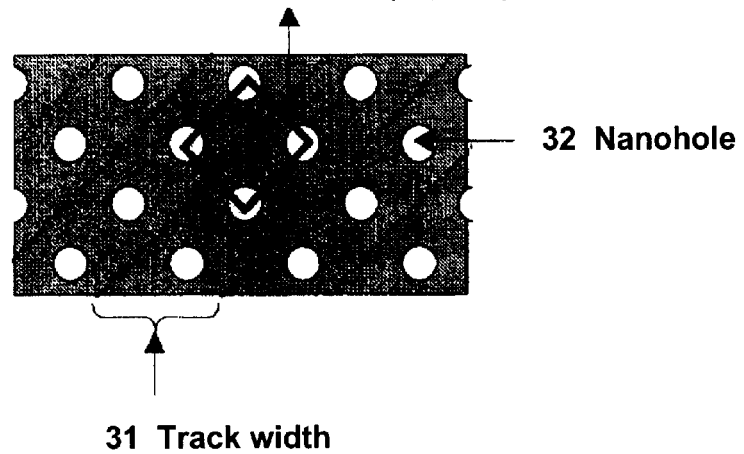
Figure 4:
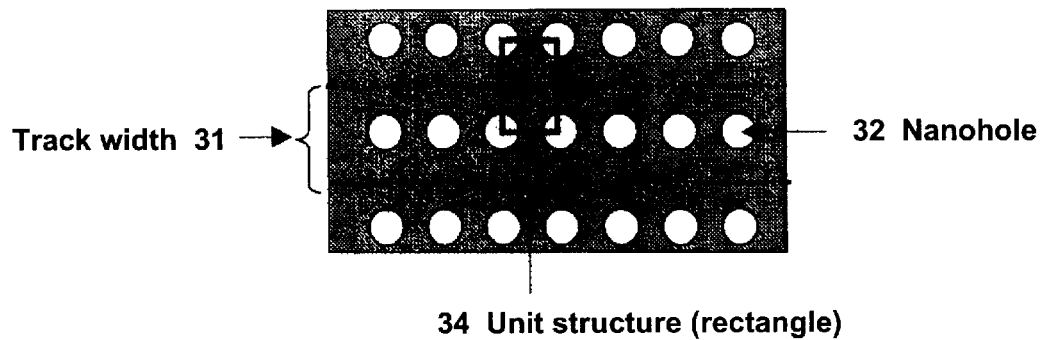
FIG. 4(a) schematically shows a pattern of nanoholes aligned in rectangles to form tracks in circular orbits that are defined by planes perpendicular to the center axis of a cylindrical substrate of a cylindrical magnetic recording medium.
FIG. 4(b) schematically shows a pattern of nanoholes aligned in rectangles to form tracks in a spiral orbit whose center is the center axis of a cylindrical substrate of a cylindrical magnetic recording medium.
FIG. 4(c) schematically shows a pattern of nanoholes aligned in rhombi to form tracks in circular orbits that are defined by planes perpendicular to the center axis of a cylindrical substrate of a cylindrical magnetic recording medium.
FIG. 4(d) schematically shows a pattern of nanoholes aligned in rhombi to form tracks in a spiral orbit whose center is the center axis of a cylindrical substrate of a cylindrical magnetic recording medium.
Figure 4:
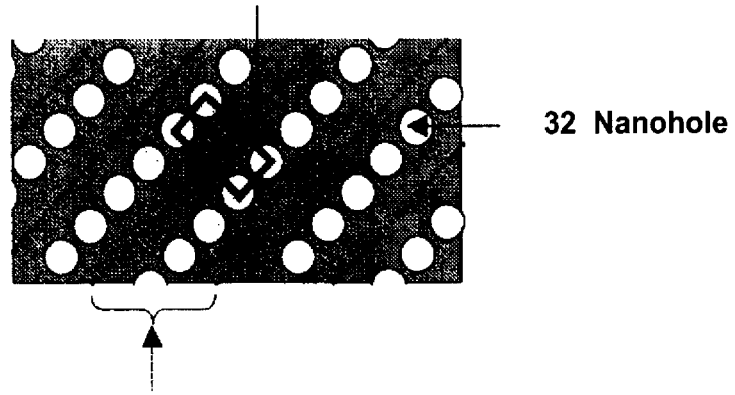
Figure 4:
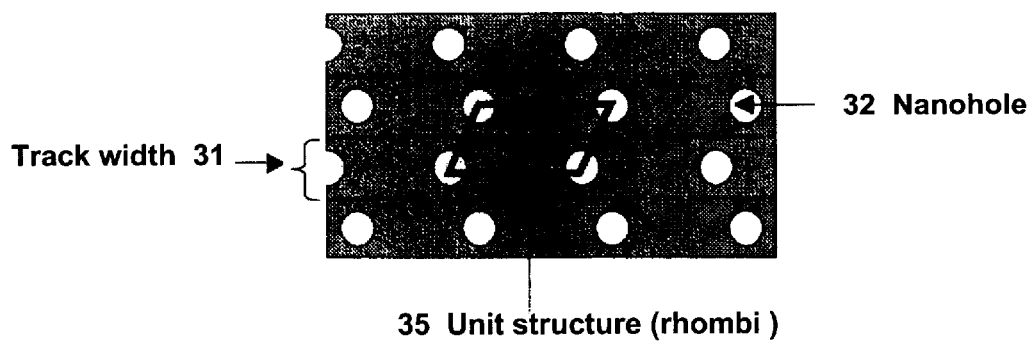
Figure 4:
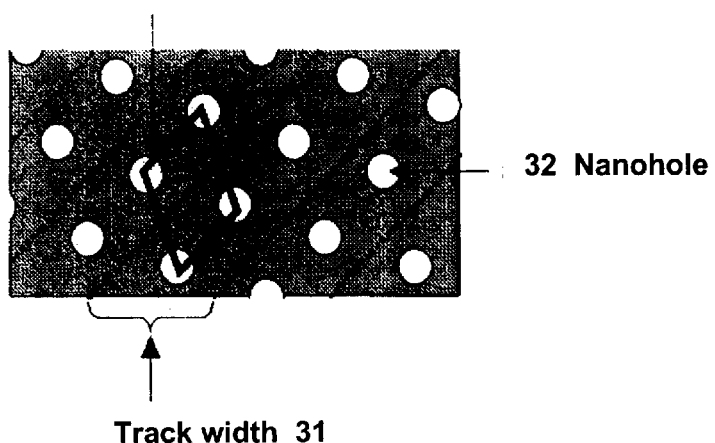
Figure 5:
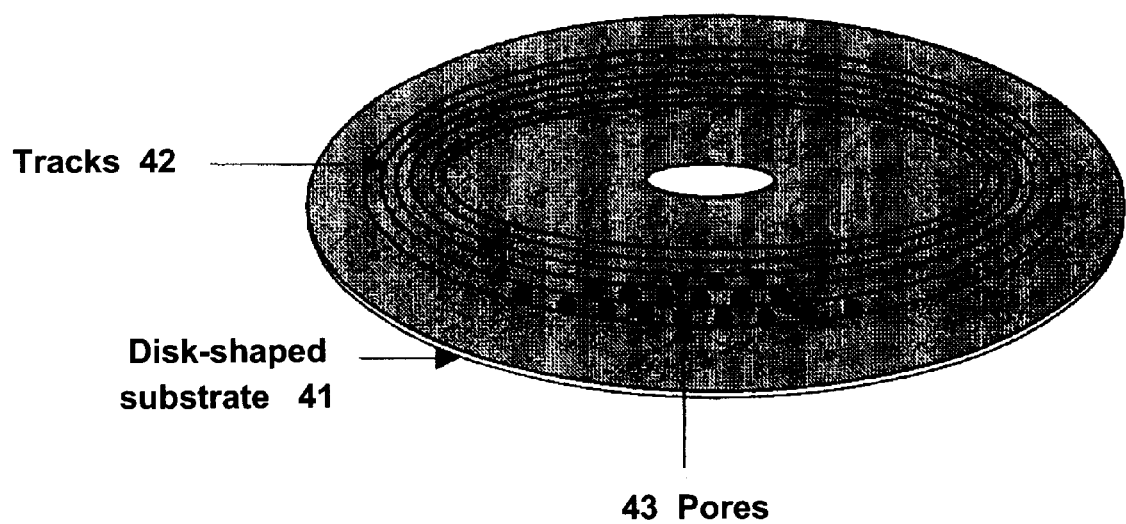
FIG. 5 schematically shows a pattern of concentric tracks formed on a disk-shaped magnetic recording medium.
Figure 6:
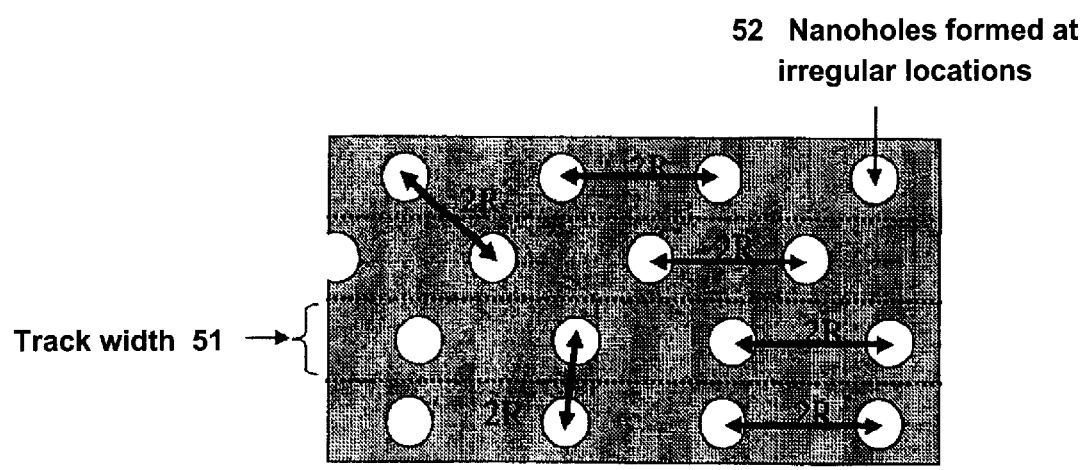
FIG. 6 schematically shows a pattern indicating an alignment of nanoholes on the disk-shaped magnetic recording medium in FIG. 5.

FIGS. 3(a), 3(b) and FIGS. 4(a) through 4(d) show arrangements of nanoholes 32 manufactured by the method described above. FIG. 3(a) schematically shows a pattern of nanoholes aligned in squares 33 to form tracks in circular orbits that are defined by planes perpendicular to the center axis of a cylindrical substrate of a cylindrical magnetic recording medium. FIG. 3(b) schematically shows a pattern of nanoholes 32 aligned in squares 33 to form tracks in a spiral orbit whose center is the center axis of a cylindrical substrate of a cylindrical magnetic recording medium. FIG. 4(a) schematically shows a pattern of nanoholes 32 aligned in rectangles 34 to form tracks in circular orbits that are defined by planes perpendicular to the center axis of a cylindrical substrate of a cylindrical magnetic recording medium. FIG. 4(b) schematically shows a pattern of nanoholes 32 aligned in rectangles 34 to form tracks in a spiral orbit whose center is the center axis of a cylindrical substrate of a cylindrical magnetic recording medium. FIG. 4(c) schematically shows a pattern of nanoholes 32 aligned in rhombi 35 to form tracks in circular orbits that are defined by planes perpendicular to the center axis of a cylindrical substrate of a cylindrical magnetic recording medium. FIG. 4(d) schematically shows a pattern of nanoholes 32 aligned in rhombi 35 to form tracks in a spiral orbit whose center is the center axis of a cylindrical substrate of a cylindrical magnetic recording medium. In the examples shown in FIGS. 3(b), 4(b) and 4 (d), the nanoholes aligned may form tracks in a plurality of spiral orbits whose center is the center axis of a cylindrical substrate of a cylindrical magnetic recording medium.

In the types of pore arrangements shown in FIGS. 3(a) and 3(b) in which the pores form a plurality of vertical rows and a plurality of horizontal rows that intersect with each other and in which the quadrilaterals formed by intersecting points of the vertical and horizontal rows are squares, a recording medium in which all nanoholes are aligned at a constant interval can be obtained. In the types of pore arrangements shown in FIGS. 4(c) and 4(d), six pores adjacent to one pore form a hexagon whose vertices are the six pores and in which the hexagons form a honeycomb structure. In one embodiment, six pores adjacent to one pore may form a regular hexagon whose vertices are the six pores and in which the regular hexagons form a honeycomb structure, as shown in FIG. 4(d). In this case, nanoholes are aligned close-packed and regularly, which is an alignment effective for improving recording density. It is noted that the pore tracks and intervals in the type of pore arrangement shown in FIG. 4(c) may be adjusted such that six pores adjacent to one pore may form a regular hexagon whose vertices are the six pores and in which the regular hexagons form a honeycomb structure.

A regular alignment described above may be required due to the possibility that the following problems could occur. First, without a regular alignment of pores throughout the entire substrate, there would be a mixture of extremely wide intervals and extremely narrow intervals among pores. In this state, there is a possibility of pores forming in irregular positions in parts with wide interval among pores and among tracks in the anodizing process.

Further, if a stamper is to be used to form starting points for anodization, technical difficulties are anticipated to manufacture a stamper with a peculiar pore alignment pattern in which not only the pore interval within a single track on the substrate is constant, but also the pore interval among different tracks.

In addition, when the interval among pores is extremely small due to high density recording, the distance among adjacent pores varies if a regular pore alignment is not realized throughout the entire substrate, which can cause deviations in the magnetic interaction applied among pores. As a result, there is a possibility that pores in some areas would not be influenced by the magnetic interaction with adjacent pores and therefore be able to retain the magnetization of the magnetic substance within the pores, while pores in other areas may become unable to retain the magnetization of the magnetic substance in the pores due to the magnetic interaction with adjacent pores. Another possibility is that the size of the magnetic field required for writing could be influenced when writing with a magnetic head in pores embedded with a magnetic substance. These problems mean that information recorded cannot be retained or information cannot be written properly.

These problems can be avoided by forming tracks that are in parallel on the outer circumference surface of a cylindrical substrate along the center axis of the cylindrical substrate, that have as their center the center axis of the cylindrical substrate, and that form circular orbits that define planes perpendicular to the center axis, or by forming tracks that are in a spiral orbit whose center is the center axis of a cylindrical substrate; and by forming pores in a plurality of vertical rows and a plurality of horizontal rows that intersect with each other, in which quadrilaterals formed by intersecting points of the vertical rows and the horizontal rows are squares, rectangles or rhombi. In the case of the circular orbits and spiral orbits formed on the cylindrical substrate, the length of all tracks is constant, which is favorable since the recording density does not vary in all of the tracks, unlike tracks provided on a disk-shaped substrate in which the recording density varies on the inner side and outer side of the disk shaped substrate.

Regularly aligned pores made of nanoholes may be formed by any one of a variety of methods including a method to anodize in two stages; a method to use a stamper to manufacture on the surface of a substrate depressions that become starting points to form pores; a method to irradiate FIB on the surface of a substrate to manufacture depressions that become starting points to form pores; and a method to form patterned pores by uniformly coating a resist resin on the surface of a substrate, patterning the resist resin using photolithography or electron beam lithography technique, and performing a dry etching to manufacture depressions that become starting points that form the patterned pores. To align nanoholes in any regular manner over a wide area, a method using a stamper is effective.

The stamper can be manufactured by patterning a resist using an electronic beam lithography and performing a dry etching. By selecting the anodizing voltage such that the R [nm]=2.5×V [volts], where R [nm] is interval between adjacent depressions that become starting points to form pores using the stamper, a regularly patterned structure reflecting the depressions can be obtained. After providing depressions that become starting points to form the pores, ordinary anodization processing conditions can be used. Various types of acids may be used in the anodization of Al, but it is preferable to use a sulfuric acid bath to manufacture nanoholes at a minuscule interval, a phosphoric acid bath to manufacture nanoholes at a relatively large interval, and an oxalic acid bath to manufacture nanoholes at an intermediate interval. The processing time for anodization varies depending on the thickness of the anodized film; the processing is continued until the bottom section of the nanoholes formed reaches the bottom surface of the anodized film, and the end point of the anodization is determined by the current profile during anodization. The diameter of nanoholes may be enlarged through a pore-widening processing. General anodizing processing conditions can also be used when performing FIB or two-stage anodization.

Al is commonly used as the anodized film layer due to the superior perpendicularity, linearity and independence of its pores, but other elements may be included as long as the film has Al as its main component and can be anodized. To form an Al film, a vacuum deposition method using resistance heating, a sputtering method or a CVD method may be used. However, a method is not favorable unless it can form a film whose surface is flat to some degree.

The vacuum deposition method or the sputtering method may be used to embed a magnetic substance in nanoholes, but electrodeposition method is favorable to embed a magnetic substance in pores with high aspect ratio.

The underlying electrode layer 12 at the bottom section of the nanoholes may be any conductive, nonmagnetic metal, and various types of materials may be used for the underlying electrode layer 12. However, a material with good electrocoating controllability, such as Cu, an alloy whose main component is Cu, or a precious metal, is desirable since the magnetic substance is embedded in the nanoholes using the electrodeposition method.

A soft magnetic layer of NiFe can be provided beneath the underlying electrode layer 12 to create a soft under layer (SUL) for the recording layer comprising the magnetic substance embedded in the nanoholes.

At least a part of pores manufactured through anodization is occupied with the magnetic substance through electrodeposition. Consequently, the magnetic substance does not have to be filled in all pores, meaning that a part of the pores does not have to be filled with the magnetic substance, as long as this does not cause any adverse effect on recording and reading.

It is desirable for the surface of a cylindrical magnetic recording medium to have opening sections of pores closed by a filler, and for a surface polishing to be rendered using an abrasive such as diamond slurry so that surfaces comprising the filler and the outer circumference surface of the cylindrical substrate form a single surface. The filler refers to component materials of the magnetic substance that occupies all or at least a part of the pores. In addition, to provide abrasion resistance to friction with the magnetic head, a nonmagnetic material such as carbon, Carbide and a nitride can be used to provide a protective layer on the surface.

For the substrate 11, plastic, Al with Ni—P plating, glass, carbon and Si—C can be used, as long as it is cylindrical in shape.

Figure 8:
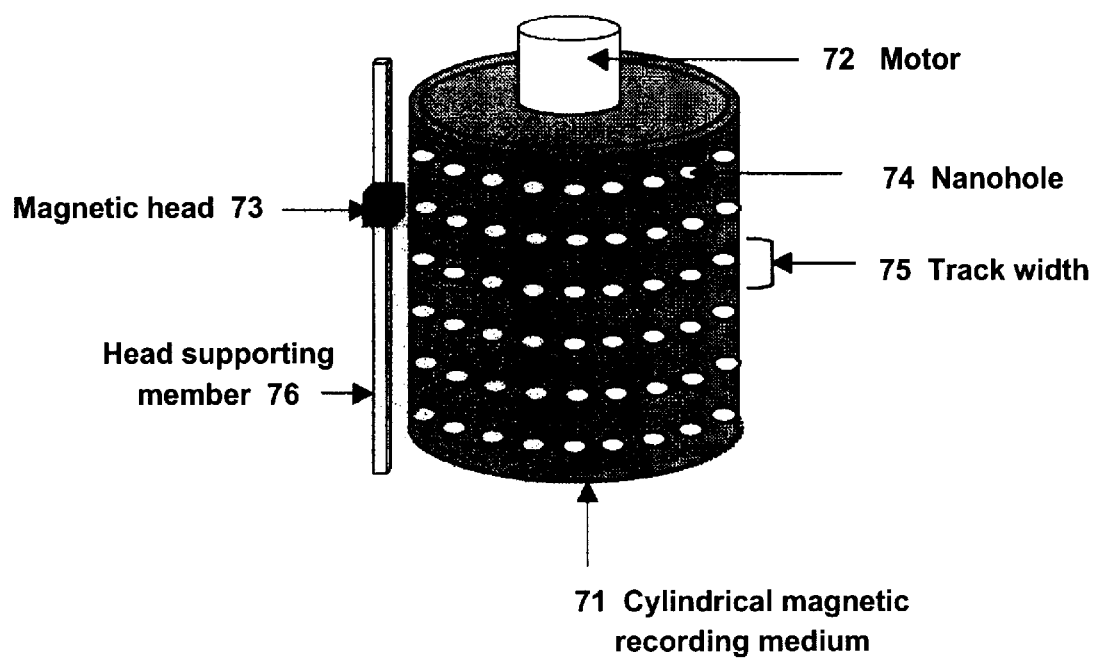
FIG. 8 schematically shows a perspective view illustrating a process to magnetically record onto a cylindrical magnetic recording medium.

As shown in FIG. 8, magnetic recording and reading can be performed in a stable manner on a cylindrical magnetic recording medium by rotating the cylindrical magnetic recording medium and scanning a magnetic head positioned in close proximity to the surface of the cylindrical magnetic recording medium along a rotation axis of the cylindrical magnetic recording medium (in a vertical direction in the figure) to record information or read recorded information.

EMBODIMENT EXAMPLES (Embodiment 1) Manufacture of Cylindrical Magnetic Recording Medium First, the sputtering method was used to form a 50 nm Cu film and a 500 nm Al film on the outer circumference surface of a cylindrical glass substrate. Next, the substrate was anodized by applying a voltage of 40 V at 16° C. in a 0.3 M oxalic acid aqueous solution, and nanoholes were formed on the outer circumference surface of the cylindrical glass substrate. As a pore-widening processing to enlarge the diameter of the nanoholes formed, a wet etching, in which the substrate was immersed in a 0.5 wt % phosphoric acid aqueous solution for 40 minutes, was rendered.

Co with an hcp structure whose c axis is oriented towards the center axis of the cylinder shape, i.e., in the radial direction, was embedded in the nanoholes formed according to the procedure described above through electrodeposition. In the electrodeposition, a mixed solution of 0.2 M of cobalt sulfate (II) heptahydrate and 0.3 M of boric acid was used at 24° C. Ag/AgCl was used as the reference electrode, and Co electrodeposition was conducted at −1.0 V.

Next, the electrodeposited (Co) overflowing from nanoholes was removed by surface-polishing it, so that the surfaces comprising the magnetic substance would become flush with the outer circumference surface of the cylindrical substrate. The abrasive used was ¼ μm diamond slurry.

When a part of the surface of the substrate was observed with FE-SEM (field-emission scanning electron microscope), it was confirmed by plane images of the surface of the substrate that Co was embedded in every nanohole. Furthermore, it was confirmed from cross-sectional images of the surface of the substrate that nanoholes with high linearity towards the center axis of the cylindrical shape of the substrate, i.e. in the radial direction, were formed.

Based on the above, even when nanoholes were formed on the outer circumference surface of a cylindrical substrate, a high value for filling rate of electrodeposited substance into the nanoholes was obtained, similar to that in nanoholes formed on flat substrates.

(Embodiment 2) Manufacture of Nanoholes Using a Stamper

Figure 7:
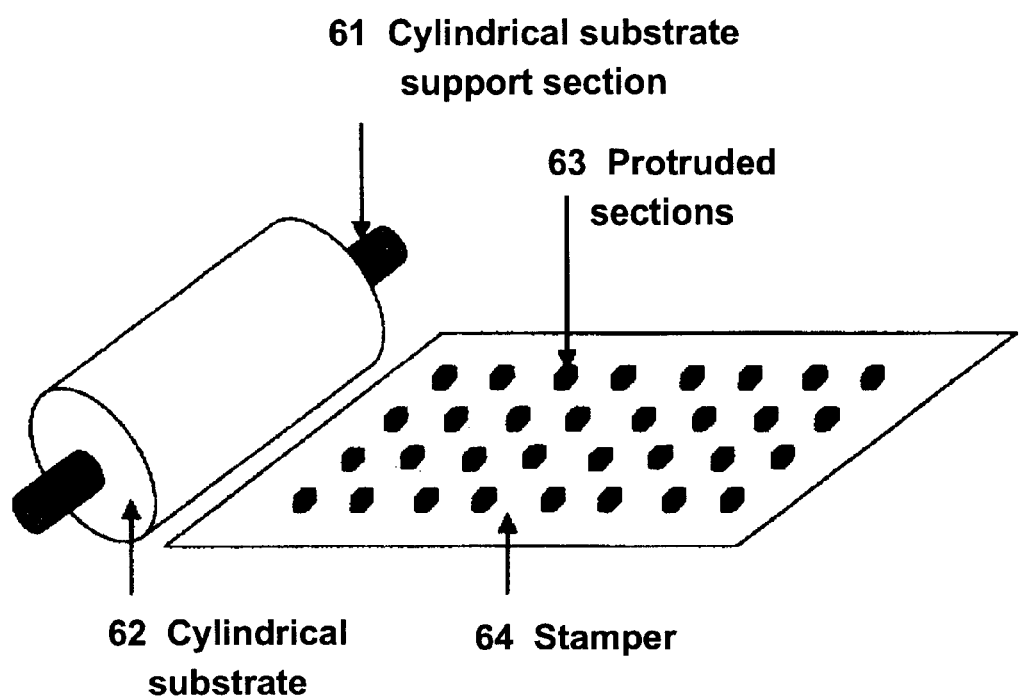
FIG. 7 schematically shows a process to transfer patterned protrusions of a stamper onto an outer circumference surface of a cylindrical substrate.

First, a stamper with protrusions aligned in a honeycomb shape on the surface of a flat substrate was prepared. Next, a cylindrical substrate on which an Al film is formed as in Embodiment 1 was prepared, and the protrusion pattern of the stamper was transferred onto the outer circumference surface of the cylindrical substrate. In the transfer, a cylindrical substrate support section 61, as shown in FIG. 7, was provided in the center of a cylindrical substrate 62; using the cylindrical substrate support section 61 as a shaft, the cylindrical substrate 62 was rolled to press down on the surface of a stamper 64 with protrusions 63. Through this step, the protrusions 63 of the stamper 64 were transferred as depressions on the outer circumferential surface of the cylindrical substrate 62. The cylindrical substrate on which were formed honeycomb-structured depressions on its outer circumference according to the procedure described was anodized under the same conditions as in embodiment 1. Next, as a pore-widening processing to enlarge the diameter of the nanoholes formed, a wet etching, in which the substrate was immersed in a 0.5 wt. % phosphoric acid aqueous solution for 20 minutes, was rendered.

Next, a part of the surface of the substrate was observed on the FE-SEM. From plane images of the surface of the substrate, it was confirmed that nanoholes were formed in a regular alignment in honeycomb structures in parts in which the honeycomb-structured depressions were transferred, while nanoholes were formed randomly in parts in which the depressions were not transferred. Based on this, it was confirmed that the depressed parts provided on the cylindrical substrate became starting points of anodization, where anodization progressed preferentially, and that regular alignment of nanoholes was achieved on a cylindrical substrate as in a flat substrate. Furthermore, when a cross-sectional image of a sample surface was checked, it was confirmed that nanoholes with high linearity towards the center axis of the cylindrical shape of the substrate, i.e. in the radial direction, were formed, as with the nanoholes formed in Embodiment 1.

Nanoholes were formed using the same method with a stamper having protrusions aligned in squares, a stamper having protrusions aligned in rectangles, and a stamper having protrusions aligned in rhombi, each on the surface of a flat substrate. In each case, it was confirmed that nanoholes in regular alignment reflecting the alignment of protrusions on the corresponding stamper were formed.

(Embodiment 3) Recording onto a Cylindrical Magnetic Recording Medium and Observing with an MFM (Magnetic Force Microscope)

Nanoholes aligned in honeycomb structures on the outer circumference surface of a cylindrical substrate were formed as in Embodiment 2, and Co electrodeposition and surface polishing were performed as in Embodiment 1 in order to manufacture a cylindrical magnetic recording medium. The diameter of nanoholes used in the present embodiment was 50 nm and the interval among nanoholes was 100 nm.

As shown in FIG. 8, a motor 72 was installed in the center section of a cylindrical magnetic recording medium 71, and a magnetic head 73 was placed in close proximity to the outer circumference surface of the cylindrical magnetic recording medium 71. The magnetic head 73 is guided and moveable along a head supporting member 76 positioned adjacent to the cylindrical magnetic recording medium 71.

Figure 9:
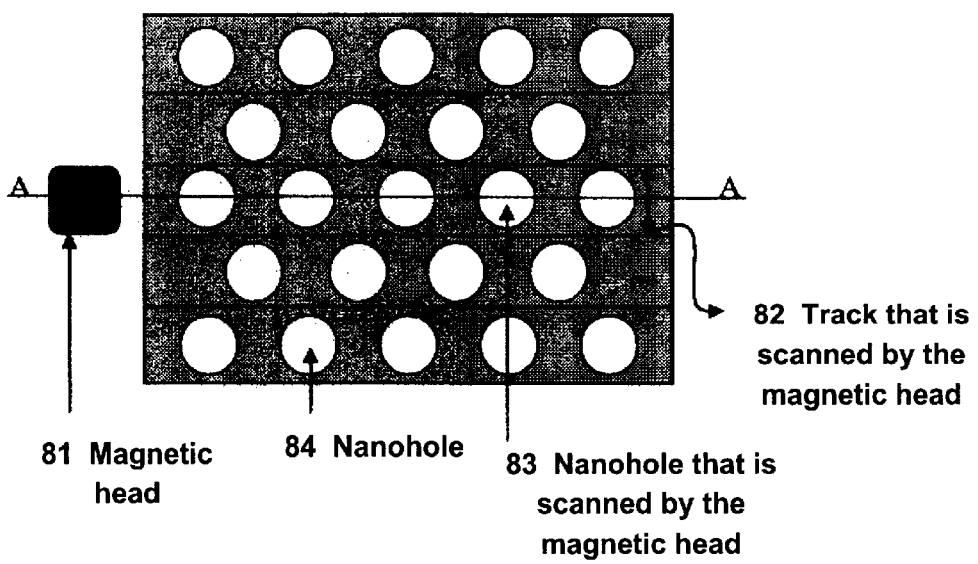
FIG. 9(a) schematically shows a process to write with a magnetic head onto a cylindrical magnetic recording medium, FIG. 9(b) schematically shows a magnetized pattern of magnetic substances within pores when an upward magnetic field is applied by a magnetic head, and FIG. 9(c) schematically shows a magnetized pattern of magnetic substances within pores when magnetic fields in random directions are applied by a magnetic head.
Figure 9:
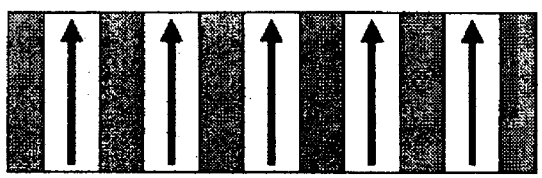
Figure 9:
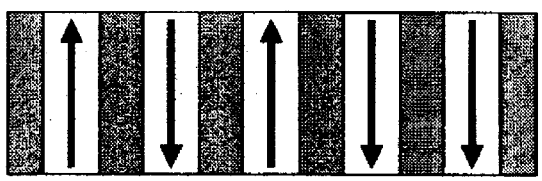

As indicated in FIG. 9(a), the position of a magnetic head 81 was finely adjusted to scan a single track, and the cylindrical magnetic recording medium was rotated as a magnetic field of 3000 (Oe) was generated from the magnetic head 81 in one direction. When a part of the surface of the substrate was observed on the MFM, the Co embedded in nanoholes 83 scanned by the magnetic head 81 was uniformly magnetized in the direction of the magnetic field, as shown in FIG. 9(b). Next, the cylindrical magnetic recording medium was rotated while a magnetic field of 3000 (Oe) in the opposite direction was applied to a track already uniformly magnetized in one direction, and this track was subsequently observed on the MFM. In this case, it was confirmed that the direction of magnetization had inverted to the direction of the magnetic field applied from the state before the magnetic field was applied. Similarly, the cylindrical magnetic recording medium was rotated while magnetic fields with randomly varying directions were applied to a track already uniformly magnetized in one direction, and this track was subsequently observed on the MFM. In this case, it was observed as shown in FIG. 9(c) that magnetizations of Co embedded in the nanoholes were in directions that corresponded to the randomly varying magnetic fields applied by the head 81.

Based on the above, it was confirmed that it is possible to record on a magnetic substance embedded in the outer circumference surface of a cylindrical substrate. By using a read head with magnetoresistive element to read magnetization of Co embedded in nanoholes as described, a cylindrical magnetic recording medium in which data can be recorded in and read from each pore can be achieved and can be used as a patterned medium.

A magnetic recording medium that is easy to manufacture, that can achieve high-density recording, and that has recording stability, can be provided by forming pores in tracks on a outer circumferential surface of a cylindrical substrate that are in parallel with one another along the center axis of the cylindrical substrate, that have as their center the center axis of the cylindrical substrate, and that form circular orbits that are defined by planes perpendicular to the center axis, or by forming tracks that are in a spiral orbit or in spiral orbits whose center is the center axis of a cylindrical substrate; and by aligning pores in squares, rectangles, rhombi, or honeycomb structures.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A cylindrical magnetic recording medium comprising:

a substrate defining a cylindrical recording surface;

a plurality of pores that are periodically aligned in a two-dimensional pattern on the cylindrical recording surface; and a magnetic substance filled in the pores.

2. A cylindrical magnetic recording medium according to claim 1, wherein vertices formed by four adjacent pores selected from the pores form a quadrilateral.

3. A cylindrical magnetic recording medium according to claim 2, wherein the quadrilateral is one of a square, a rectangle and a rhombus.

4. A cylindrical magnetic recording medium according to claim 1, wherein the pores are Alumina nanoholes formed through anodization of a layer including Al.

5. A cylindrical magnetic recording medium according to claim 1, wherein least a part of the pores is occupied with the magnetic substance.

6. A cylindrical magnetic recording medium according to claim 1, wherein the magnetic substance is filled in the pores by an electrocoating method.

7. A cylindrical magnetic recording medium according to claim 1, wherein at least an opening section of each of the pores is closed with a filler material, and a surface of the filler material is flush with an outer circumference surface of the substrate.

8. A cylindrical magnetic recording medium according to claim 1, wherein six pores adjacent to any one of the pores selected define a hexagon whose vertices are the six pores and in which the hexagons form a honeycomb structure.

9. A cylindrical magnetic recording medium according to claim 8, wherein the hexagon is a regular hexagon.

10. A recording/reading apparatus comprising:

a device for outputting and inputting data; and a cylindrical magnetic recording medium including a substrate defining a cylindrical surface, a plurality of pores that are periodically aligned in a two-dimensional pattern on the cylindrical surface, and a magnetic substance filled in the pores, wherein the device for outputting and inputting data is adapted to record data on the cylindrical magnetic recording medium.

* * * * *

UNITED STATES PATENT AND TRADEMARK OFFICE
CERTIFICATE OF CORRECTION

PATENT NO.     : 6,791,797 B1
DATED          : September 14, 2004
INVENTOR(S)    : Saito et al.

It is certified that error appears in the above-identified patent and that said Letters Patent is hereby corrected as shown below:

<u>Title page,</u>
Item [75], Inventors, replace "Tsatsuya Saito"with -- Tatsuya Saito --.

Signed and Sealed this

Fifth Day of April, 2005

JON W. DUDAS
*Director of the United States Patent and Trademark Office*